United States Patent
Cederström

[11] 3,897,883
[45] Aug. 5, 1975

[54] SUSPENSION DEVICE FOR ELECTRICAL EQUIPMENT

[76] Inventor: Rolf V. Cederström, Skyllbergsgatan 5, 124 45 Bandhagen, Sweden

[22] Filed: Mar. 11, 1974

[21] Appl. No.: 450,104

[30] Foreign Application Priority Data
Mar. 15, 1973 Sweden.............................. 7303593

[52] U.S. Cl................................. 220/18; 248/224
[51] Int. Cl........................................... B65d 25/24
[58] Field of Search ............... 220/18; 248/224, 225

[56] References Cited
UNITED STATES PATENTS
2,427,335  9/1947  Antonia et al. ...................... 248/224
2,482,856  9/1949  Lloyd .................................. 248/225 X Primary Examiner—William I. Price
Assistant Examiner—Steven M. Pollard
Attorney, Agent, or Firm—Bucknam and Archer

[57] ABSTRACT

The invention relates to a device for temporary suspension of electrical equipment and like means on a wall or other support, comprising attachments adapted to be mounted on the wall and fixing elements arranged on said equipment so as to project therefrom. The attachment may be so designed that the fixing elements cooperating with the attachments are lockable therein. The fixing elements are so designed that they serve not only as means cooperating with the attachments but also as shock-absorbing means for the equipment in question.

10 Claims, 6 Drawing Figures

FIG.1

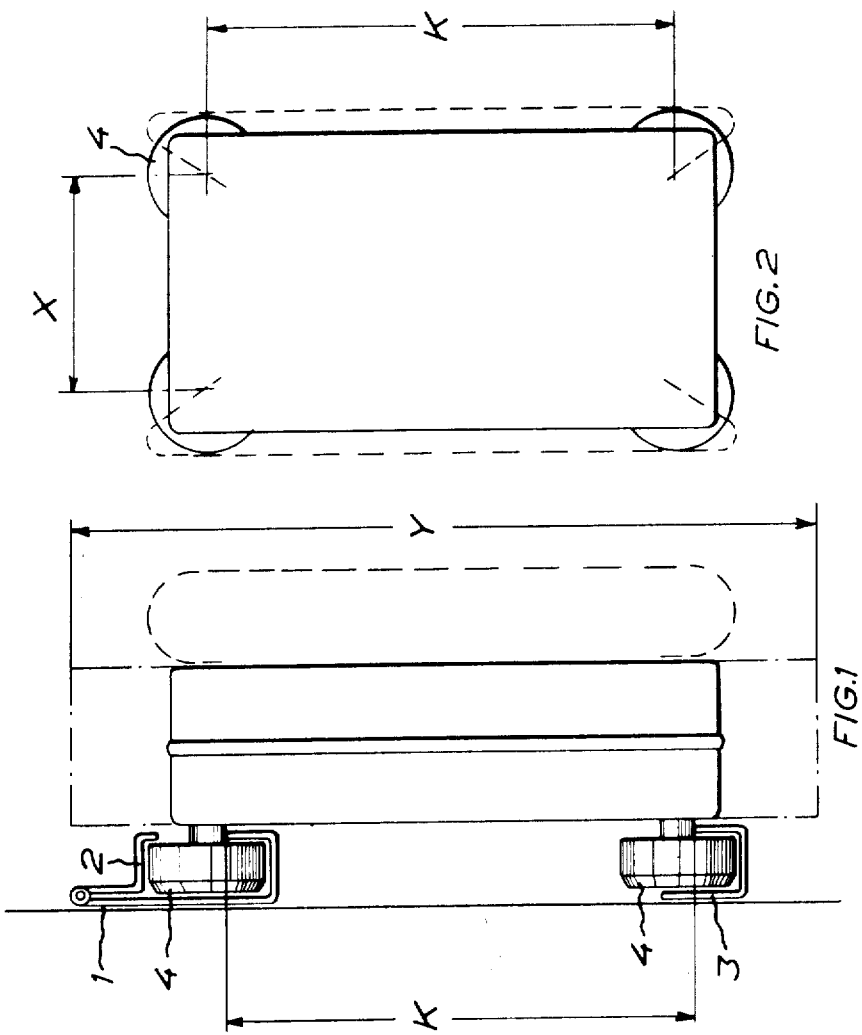

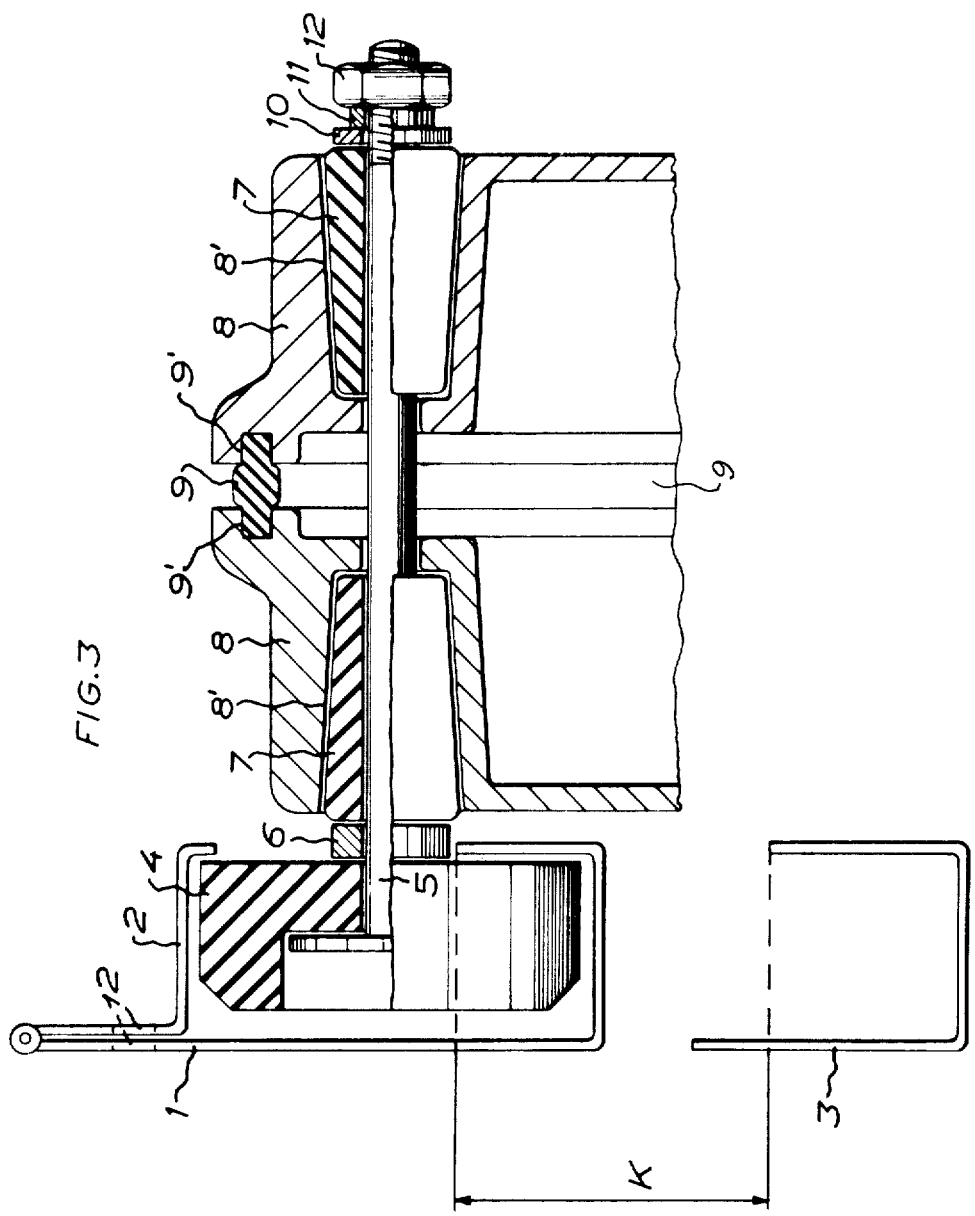

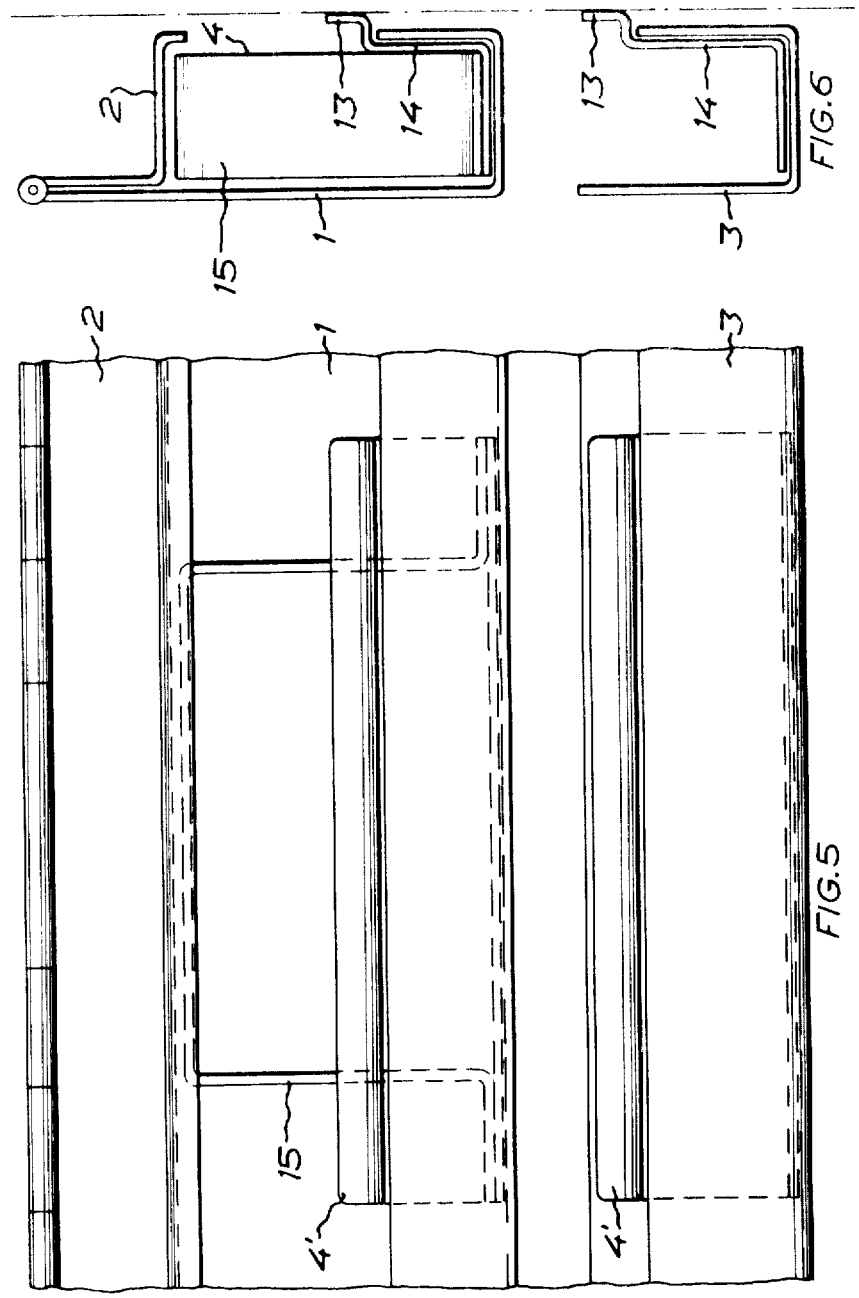

SUSPENSION DEVICE FOR ELECTRICAL EQUIPMENT

The present invention relates to a device for detachable and lockable and preferably shock-absorbing suspension of electrical equipment and like means, such as enclosed terminals, on walls or like supports.

Especially in building sites, there is often needed connecting points providing a possibility of exchanging or supplementing terminal units and like electrical apparatus. The market offers special mobile electric power units to which a plurality of terminals of identical or different types can be connected. Such units are suitable for use as group units on large premises but in case of operations of small extent and short duration they rarely come into use because it is too expensive and time-consuming to arrange such units at, for instance, every working station within a large building site. In that case cables are drawn from a power unit, which may be of the type just mentioned, up to the individual working stations and are connected with suitable fused or unfused terminals available in the market. A problem with such terminals and similar cable-connected equipment resides in that they can easily be damaged mechanically or by moisture if they are left on the ground or on the floor, as is most often the case today. Of course, it is possible to take special steps to attach them to a wall or the like, but usually this will not be done since the periods of use often are short. Another problem with cable-connected means is that they can be easily disconnected and taken away by people who have no business on the premises.

This invention has for its object to provide a device solving the problems mentioned above. The device according to the invention comprises at least one attachment adapted to be secured to a wall or like support and, also, at least one fixing element cooperating with said attachment and arranged on the object to be suspended, said attachment includes an upwardly open recess into which a downwardly extending part of the fixing element placed on the outside of said object is adapted to be inserted and at least one such attachment is provided with a flap-like movable element which, in one position, permits insertion and removal of fixing elements respectively in and from the recess of the attachment but, in another position, locks the fixing elements inserted in said recess.

An example of embodiment of the device of the invention will be described in more detail hereinafter with reference to the accompanying drawings in which:

FIG. 1 is a side elevation of a pair of attachments including an object to be attached with fixing elements in suspended position;

FIG. 2 is a frontal view showing only the object to be attached including fixing elements;

FIG. 3 is an end view showing the two attachments on a larger scale and a section of the top portion of the object to be attached with the fixing element;

FIG. 5 is a frontal view of a modified design of an upper and a lower attachment with fixing elements engaged therewith; and FIG. 6 is a side view of the attachments and fixing elements of FIG. 5.

Figure 4:
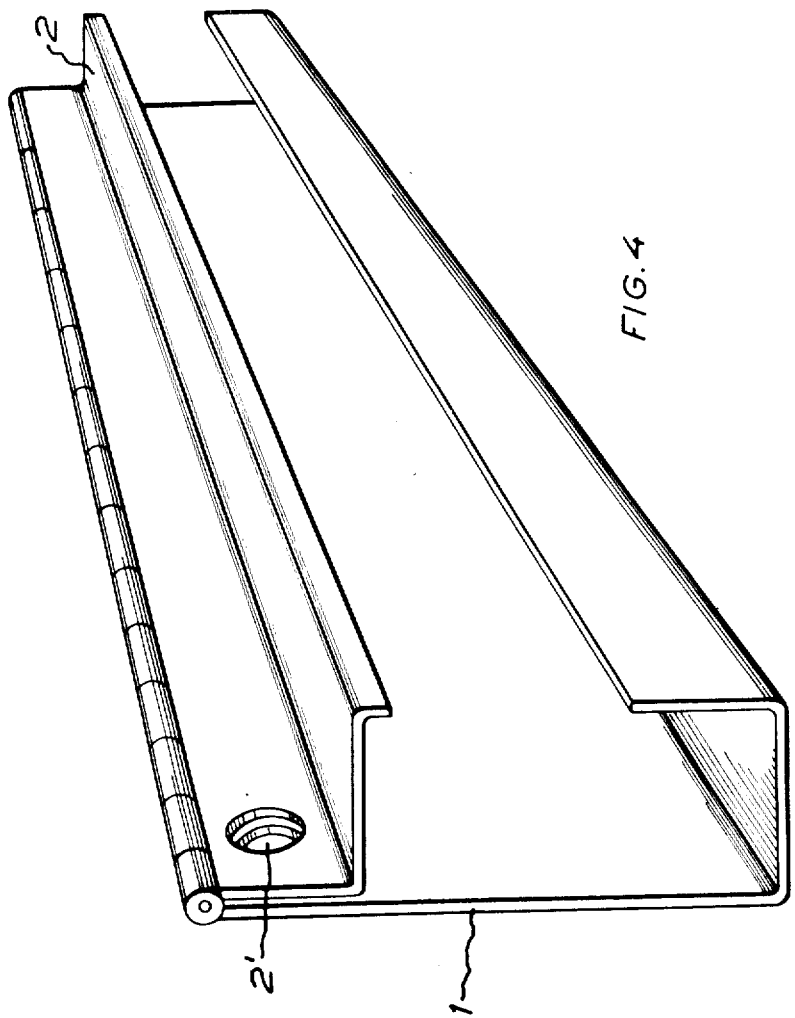
FIG. 4 is a perspective view showing on a larger scale the upper attachment.

In the preferred embodiment shown in the drawings, two attachments or rails are used in the upper one 1 of which is provided with a locking flap 2, whereas the lower one has no such flap. When two attachments or rails are used, they should be fixed to the support at a predetermined distance, K in FIG. 1.

The upper rail 1 is provided with the flap 2 which is adapted to pivot on hinges or like means and returns to locking position by gravity and remains there. This prevents automatically, over the entire length of the attachment, any unintentional detachment of the attached object. The pivotally mounted flap 2 can also be fixed in locking position by means of e.g. a padlock fitted in the holes designated 2', and this also prevents undue detachment of the objects attached to the rails.

The rails constituting the attachments can be so made as to be of any length desired with respect to the suspending capacity required or available space.

The objects to be attached can have any width desired, measure X in FIG. 2, and also, within certain practical limits, any height desired, measure Y, on condition that those parts of the edge portions of the object which have been formed for cooperation with the attachments, comprise the measure K. This is indicated by dot-dash lines in FIG. 1.

Objects to be fixed to the attachments of the invention need not be of the advanced type described in FIG. 3.

The simplest embodiment may consist of a flat panel which has been provided with a fixing element 4 at each corner. The fixing elements may suitably be formed of elastic material which has a shock-absorbing effect when the object is not lodged in the attachment but is under transport or is stored up. How the fixing elements protruding at the corners of the object serve as a shock-absorbing device is apparent from FIG. 2.

Electric equipment often implies high demands for shock protection and also for density. To satisfy the requirements for shock protection, the connection between the object to be attached and the attachment may be formed so as to produce a damping effect.

An example of how this can be achieved is shown in the embodiment according to FIG. 3. An object to be attached is formed as two covers or halves 8 which are substantially identical at least with respect to their opposed parts and which enclose the electrical apparatus. At each corner the covers are provided with seats 8' for bushings 7 of elastic material. Interposed between the covers is a sealing joint 9. Extending through the bushings is a set bolt 5 secured to the fixing element 4 and including a relieving washer 10 and a lock nut 12. If required, a spacer or protective ring 11 may be fitted under the lock nut.

By overdimensioning the bore in the washer 10 protective brackets can be attached to the set bolts, as shown in broken lines in FIGS. 1 and 2, whereby the bushings also elastically absorb stresses therefrom.

An embodiment giving a very high density is realized by making the sealing joint 9 endless and fitting it in seats 9' outside or inside the seats 8' for the bushings 7. This produces at the same time a certain flexibility between the cover halves, which further increases the technical value of the device.

However, it is not always necessary to have a shock-absorbing suspension of the objects. FIGS. 5 and 6 show fixing elements of a simpler design which can be employed for resistant objects. The fixing elements, designated 4', consist of bent sheet metal or like material having a flange 13 intended for connection with the object to be attached. An angularly bent portion 14 offset in parallel with respect to said flange is adapted to enter inside the outer flange portion of the rail 1 and 3, respectively, so that it will rest against the rail bottom and/or the edge of the flange portion. The fixing elements 4' adapted to cooperate with a rail having a locking flap are provided with a bracket 15 which is attached to the portion 14 and has a height corresponding to the distance between the rail bottom and the lowered underside of the locking flap, said bracket preventing, in the lowered position of the flap, the detachment of the fixing elements and the object.

The fact that the detail 15 is in the form of an open bracket gives the advantage that it may serve as a handle for a loose object.

Although the preferred embodiment shown comprises a pair of cooperating attachments or rails, it obviously is possible to use only one rail with or without locking flap, where one end of the object or the fixing elements attached to it are allowed to bear against the support on which the rail is fitted. However, the embodiment including a pair of cooperating rails is to be preferred since this provides sure retention of the upper as well as the lower portions of the object.

The invention should thus not be considered limited to that described above and shown in the drawing but can be modified in various manners within the scope of the following claims.

What I claim and desire to secure by Letters Patent is:

1. A device for detachable and lockable suspension of equipment, wherein the device comprises at least one attachment adapted to be secured to a wall or like support and, also, at least one fixing element cooperating with said attachment and arranged on the object to be suspended, said attachment includes an upwardly open recess into which a downwardly extending part of the fixing element placed on the outside of said object is adapted to be inserted and at least one such attachment is provided with a flap-like movable element which, in one position, permits insertion and removal of fixing elements respectively in and from the recess of the attachment but, in another position, locks the fixing elements inserted in said recess.

2. A device according to claim 1, wherein an attachment comprises a long, substantially U-shaped rail of which one flange, which is adapted to be secured to the wall, is longer than the other flange, a fixing element is generally cylindrical or shaped as a roller and connected with the object by means of a centrally located pin, the depth of the U-shaped portion of the rail substantially agrees with the extent of the fixing element, as counted from the peripheral surface to the central pin, and a movable element on the rail consists of a flap pivotally attached to the long flange portion and including a bent portion which, in lowered locking position, is spaced from the bottom of the U-shaped part of the rail at a distance corresponding to the total diameter or extent of the fixing element.

3. A device according to claim 1 wherein the fixing element at least partly is made of elastic shock-absorbing material and at least two fixing elements are so arranged on said object that they partly extend beyond the corners of said object.

4. A device according to claim 1, wherein a pair of rails are substantially horizontally arranged on a support and cooperate with fixing elements arranged at the top and the bottom of an object to be suspended in order to provide a double-sided retention of said object, and one of the pair of rails is provided with flap-like locking means.

5. A device according to claim 1, wherein at least two fixing elements are elastically connected with said object to be suspended.

6. A device according to claim 2, wherein a centre pin connecting a fixing element with said object extends through bores in the casing of said object, and pade of elastic material are interposed between the pin and the walls of the bore.

7. A device according to claim 6, wherein the bores in the casing of said object are aligned in pairs and taper towards each other, the pads consist of a pair of complementarily tapering bushings of elastic material and the pins of each fixing element are so arranged that the bushings can be compressed in their bores by means of said pins.

8. A device according to claim 7, wherein the two bores are arranged each in one half of the casing of said object divided substantially in parallel with the plane of suspension, the fixing element pin serving also as a retaining means for said halves.

9. A device according to claim 8, wherein an elastic joint serving as a seal and a flexible transition between the halves is inserted between the two halves forming the casing.

10. A device according to claim 1 wherein a pair of rails are adapted to be placed at a predetermined distance from each other, and said distance is determined by the vertical distance between fixing elements arranged at the top and bottom of said objects.

* * * * *